United States Patent
Branson et al.

(10) Patent No.: US 8,276,200 B2
(45) Date of Patent: Sep. 25, 2012

(54) SYSTEMS AND METHODS FOR SECURELY PROCESSING SENSITIVE STREAMS IN A MIXED INFRASTRUCTURE

(75) Inventors: Michael John Branson, Rochester, MN (US); Frederick Douglis, Basking Ridge, NJ (US); Parijat Dube, Yorktown Heights, NY (US); Zachary A. Garbow, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1235 days.

(21) Appl. No.: 11/971,315

(22) Filed: Jan. 9, 2008

(65) Prior Publication Data

US 2009/0178137 A1  Jul. 9, 2009

(51) Int. Cl.
*G06F 11/00* (2006.01)
*H04L 9/32* (2006.01)

(52) U.S. Cl. ............................................ 726/22; 726/26
(58) Field of Classification Search ................... 726/11, 726/13–14, 22–26; 713/187–188
See application file for complete search history.

(56) References Cited

U.S. PATENT DOCUMENTS

| 5,842,002 A * | 11/1998 | Schnurer et al. ................. 703/21 |
| 2007/0094394 A1* | 4/2007 | Singh et al. ..................... 709/226 |
| 2008/0065639 A1* | 3/2008 | Choudhary et al. .............. 707/7 |

* cited by examiner

*Primary Examiner* — Hosuk Song
(74) *Attorney, Agent, or Firm* — Tutujian & Bitetto, P.C.; Preston J. Young

(57) ABSTRACT

A system and method for securely processing sensitive streams in a mixed infrastructure includes analyzing a stream to determine data sensitivity. A likelihood that processing elements employed to process the stream would result in a risk to sensitive information is determined. At least a portion of the data stream having sensitive information is transferred to a secure processing environment to ensure security of the data stream during processing.

20 Claims, 3 Drawing Sheets

SYSTEMS AND METHODS FOR SECURELY PROCESSING SENSITIVE STREAMS IN A MIXED INFRASTRUCTURE

GOVERNMENT RIGHTS

This invention was made with Government support under Contract No.: H98230-07-C-0383 awarded by the Department of Defense (DOD). The Government has certain rights in this invention.

BACKGROUND

1. Technical Field

The present invention relates to protecting sensitive data in stream processing service environments (SPSEs), and more particularly to systems and methods for keeping sensitive data in a distributed job from leaving a secure host, and for protecting inquiries that may be mined for sensitive or revealing data.

2. Description of the Related Art

Systems for processing streams of data utilize continuous streams of data as inputs, process these data in accordance with prescribed processes and produce ongoing results. Examples of stream processing systems include System S from IBM®; StreamBase™ from StreamBase Systems™, Inc.; and Borealis™ from MIT and Brown University. In such a system, applications are composed of independent processing elements that operate on streams of data objects by filtering, combining, transforming, and otherwise analyzing the data. These operations can take the form of database operations such as merging streams and selecting tuples that match specific criteria, or they can be more general application-specific logic.

A stream processing system can be owned, operated, and used for the benefit of a single entity, such as a corporation or government organization. It can also be owned and operated as a service, in which one organization operates the system for the benefit of other organizations that pay for the use of the stream processing system.

In a stream processing service environment, such as System S, data streams from one processing element to another in near real time. It is imperative to protect sensitive data, which may exist in an inquiry, a processing element, the streaming data itself, or the results. If the stream processing is handled solely in a single infrastructure (provider), there are many methods of protecting sensitive data fairly easily and securely, including using security labels. However, in a mixed infrastructure, i.e., one that uses stream processing components (processing elements, job planners, data sources) across multiple hosts or providers, the data becomes much more difficult to protect.

To protect sensitive data, there are several points at which the data must be secured. First, there is a challenge in keeping highly sensitive data in a distributed stream processing job from leaving the secure hosts in the first place. Secondly, there exists a challenge in protecting sensitive data from being revealed by the inquiries themselves.

SUMMARY

A system and method for securely processing sensitive streams in a mixed infrastructure includes analyzing a stream to determine data sensitivity. A likelihood that processing elements employed to process the stream would result in a risk to sensitive information is determined. At least a portion of the data stream having sensitive information is transferred to a secure processing environment to ensure security of the data stream during processing.

Another system and method for securely processing sensitive streams in a mixed infrastructure includes analyzing a stream to determine data sensitivity by discovering patterns in the data stream, computing a data sensitivity measure and comparing the data sensitivity measure to a threshold. For data streams having sensitive information, a likelihood that processing elements employed to process the stream would result in a risk to sensitive information is determined, and at least a portion of data streams having sensitive information is transferred to a secure processing environment to ensure security of the data stream during processing.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
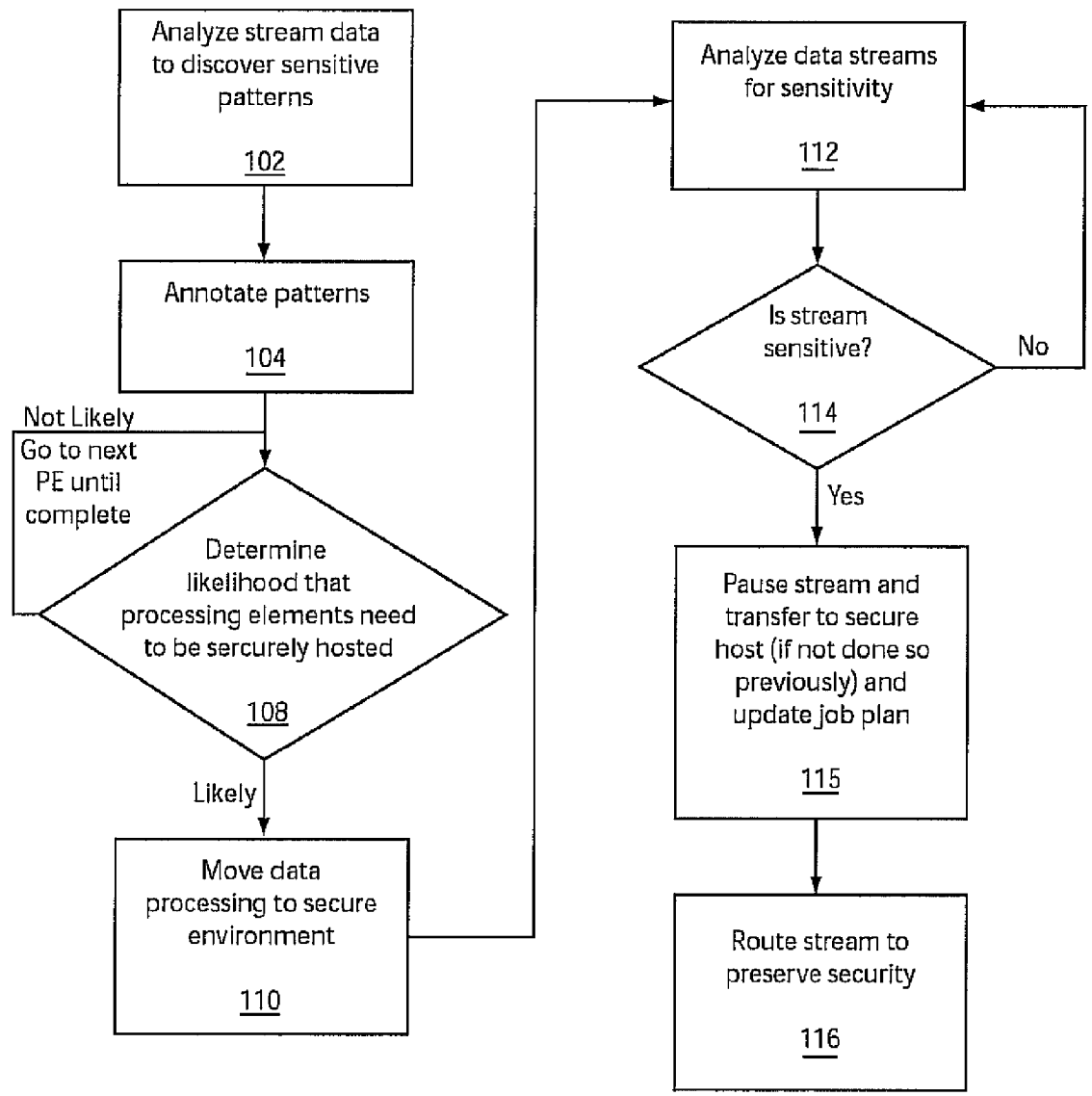
FIG. 1 is a block/flow diagram for a system/method for securely processing sensitive streams in a mixed infrastructure in accordance with the present principles.

Present embodiments described herein provide protection of sensitive data in a stream processing service environment (SPSE) by keeping sensitive data in a distributed job from leaving a secure host, and by protecting inquiries that may be mined for sensitive or revealing data. In particularly useful embodiments, methods and systems are provided for allowing different organizations to interoperate in the context of a plurality of SPSEs. A mixed infrastructure may include different organizations i.e., that use stream processing components (processing elements, job planners, data sources) across multiple hosts or providers. This may be for preserving security, to run a job plan more efficiently, etc. One characteristic of a SPSE is the existence of data and/or processing belonging to multiple organizations. In one embodiment, a SPSE can provide data and applications to a customer, wherein all data originates outside the customer's environment and is processed outside that environment. Thus, such data are not proprietary to the customer but are instead shared by the SPSE through some (contractual) arrangement.

In another embodiment, data can originate in the customer's environment and be transmitted to the SPSE for processing by applications provided by the SPSE. Data that result from this processing are then transmitted back to the customer environment.

In another embodiment, proprietary applications from the customer's environment are made available to the SPSE to execute upon data, either from the customer or the SPSE. In the case of proprietary data and/or processing, the SPSE ensures the security and integrity of the customer's property despite the possibility of other processing being performed on behalf of yet another party.

Under appropriate circumstances, not all data or processing needs to be kept secret from other users of the same SPSE. To the contrary, a SPSE can support "third-party" data and applications: one customer can arrange to access the data or applications provided by either another customer or some other organization, as long as the policies governing access to the data or applications permit such activity.

Another embodiment provides the ability for a customer of a SPSE to obtain data and/or applications from the SPSE, and then perform stream processing operations within its own execution environment rather than in the SPSE. The customer can execute applications belonging to the SPSE or to third parties that make the applications available through the SPSE. Similarly, the customer can ingest data from the SPSE that may belong to the SPSE itself or to a third party. There can be economic incentives for getting a third party to make data or applications available, though such incentives are not an absolute requirement. A computation may be separated among multiple providers to preserve security or run a job/process a stream more efficiently.

Embodiments of the present invention can take the form of an entirely hardware embodiment, an entirely software embodiment or an embodiment including both hardware and software elements. In a preferred embodiment, the present invention is implemented in software, which may include but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a system/method for dynamically transferring analytics to a secure host for improved security is illustratively depicted. In a pre-processing stage of block 102, data within a stream is analyzed by an analytic on a secure infrastructure to discover patterns of data that are likely sensitive in nature before sending the stream to a separate service provider. Patterns can be detected via data format (e.g., Social security numbers), or user configured regular expressions/patterns. There currently exist many applications for detecting sensitive data, and it is assumed that these pattern detection methods may exist or can be developed independently. The present embodiments focus on managing streams identified as sensitive by dynamically transferring the appropriate analytics to secure hosts, then routing the streams through a secure job plan. These patterns are then annotated as sensitive in block 104.

The term analytic as employed herein is somewhat synonymous with the term processing element (PE). Data in the system exists as streams, and processing is packaged into PEs. In general, processing is done for the purposes of analysis, thus the term analytic. There are some PEs that perform no real analysis (e.g., a PE that filters data), so a PE that performs some (part of) analysis of incoming streams of data is referred to as an analytic.

In a pre-execution stage, before processing a job plan, a planner determines in block 108, the likelihood of each processing element (PE) in the plan needing to be securely hosted. This may be based on the previously determined sensitivity level of data coming from a particular data source in the stream in past executions, or from user defined security levels, or other sources. The likelihood of each processing element (PE) in the plan needing to be securely hosted is checked for each PE.

If a particular data source is likely to produce sensitive data (based on previous analysis of this source), the PEs in the job plan that will process data from that data source are moved to a processing engine that is either locally hosted, or hosted in a secure environment in block 110.

In block 110, all analytics which subsequently analyze the sensitive stream are dynamically transferred to be locally hosted or hosted on a secure system. This transfer may occur either during pre-processing or during execution. Analytics are discrete applications used to execute a piece of analytical code on incoming data, producing modified results. The modifications can include, but are not limited to, filtering, annotating, calculating, buffering, etc. In a stream processing framework, multiple analytics are executed in succession to achieve an overall processing goal, such as answering an inquiry.

In an execution stage (during the processing of a job plan), in block 112, data streams are analyzed to determine their sensitivity measure similar to above. This may be performed instead of or in addition to the pre-processing analysis. In block 114, if a data stream is deemed sensitive, and the PEs to analyze that data were not transferred to a secure host during pre-execution, the stream processing of that stream is paused while the appropriate PEs are dynamically transferred to a secure host and the job plan is updated in block 115.

At this point, the stream resumes processing, with the sensitive data stream being routed to the securely hosted PEs in block 116.

It should be understood that blocks 102-110 may be implemented separately and exist independently of the blocks 112-116, and optionally the two groups (e.g., pre-processing (blocks 102-110) and execution (blocks 112-116) could be tied together as depicted in FIG. 1.

In accordance with present embodiments, some applications in accordance with the present principles are described. In one example, query isolation via sensitivity thresholds is provided. Similar to query caching in SQL implementations, inquiry/result sets within a stream processing system may be cached. Caching (and subsequently sharing) of results improves the response time for an inquiry. However, the original inquiry owner may not wish to provide their inquiries or results for caching if it includes sensitive information.

Therefore, the results for an inquiry are analyzed to determine a sensitivity measure (based on keywords and patterns detected), and according to the inquiry owner's sharing criteria, the query results will not be cached if the sensitivity measure exceeds a threshold.

The system can maintain the class of (inquiry, result) pairs from different organizations which are available for sharing. A service provider can offer the option to the customer about their willingness to share results of their inquiries. The customers can also specify the degree of sharing and subsets of customers over which to share. In return for sharing results, the customer may be offered incentives such as a reduced rate, royalties for each time the results are shared, or preferred processing priority.

For similar queries from other customers, the system can offer the option to the customer to use existing results and thus possibly pay less and retrieve faster results versus rerunning the similar inquiry from scratch.

In another useful application, distribution of inquiry processing based on sensitivity detection may be provided. Some inquiries themselves may be sensitive in nature. In an environment with multiple PE providers, if the processing of such inquiries takes place on processing elements of a single service provider, the nature of the query could be constructed by the owner of the processing elements based on the processing usage. Therefore, it is desirable to identify how sensitive inquiries should be broken up and distributed into smaller jobs across multiple providers' PEs, such that no single provider can determine the full inquiry's intent based on its usage patterns.

This includes the following, which is summarized here but illustratively described with respect to FIG. 2 below. An inquiry owner identifies how sensitive the inquiry is (see e.g., FIG. 3). A job planner breaks the job into processing components and identifies the level of sensitivity for each component (e.g., identifying a name may be more sensitive/revealing than annotating a phone call's origin). The planner compares available PEs for handling each component or combination of components, and identifies sensitive processing that cannot be distributed to untrusted hosts. This processing can be distributed to analytics that are transferred to a local or secure host, using the techniques described with reference to FIG. 1.

The planner identifies processing that, when observed collectively, is sensitive in nature. The planner assigns PEs for each processing component such that highly sensitive processing component combinations are distributed across PEs of disparate providers. Job owners can configure hosts that have a higher possible collusion level, and sensitive combinations will not be split among these hosts. During this, an analytic may be dynamically transferred to a secure host from an untrusted host, if needed. A final plan is optionally reviewed by the inquiry owner before being submitted. FIG. 2 is used for determining how to separate a job plan according to its sensitivity.

Figure 2:
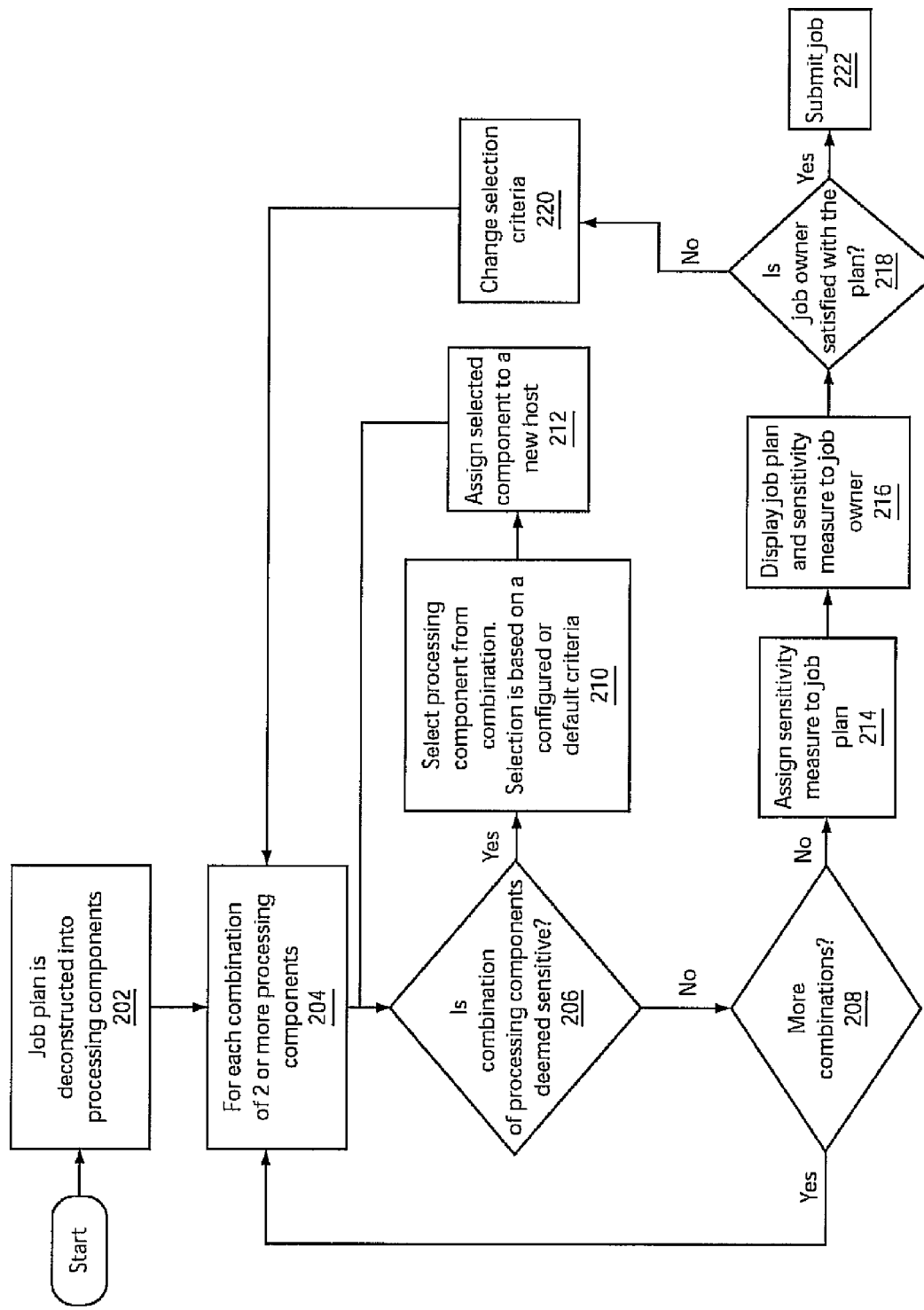
FIG. 2 is a block/flow diagram for a system/method for securely processing sensitive streams in a mixed infrastructure by distributing processing components based upon sensitivity combinations in accordance with the present principles.

Referring to FIG. 2, an illustrative system/method for distribution of processing components based on sensitivity of combinations is depicted. FIG. 2 determines how to separate a job plan according to its sensitivity. Sensitivity determination will be described with reference to FIG. 3, which determines sensitivity for the distribution of pieces of the content among multiple service providers as described in FIG. 2.

In block 202, a job plan is deconstructed into processing components. A processing component includes portions of jobs or tasks that need to be performed by a device or system that processes data in a data stream. In block 204, each combination (e.g., of 2 or more processing components) is evaluated. In block 206, a determination of whether a combination of processing components is deemed sensitive is made. Sensitivity may be determined based upon one or more criteria, e.g., input by a user, classified and flagged in advance, follow combinatorial rules (combinations of information that may make the data sensitive), etc. Information represented by the data may be pre-designated as sensitive, the data may include sets of criteria such that when in combination the sets of criteria result in sensitive material or a sensitive combination.

If the combination is not deemed sensitive, a determination of whether more combinations need to be checked is made, in block 208. If there are more combinations, the path returns to block 204. If the combination is deemed sensitive, processing components are selected from the combination, where the selection is based on given or present criteria. For example, if the processing component is deemed to be able to process a certain sensitivity level, that component is selected for transfer. In block 212, the selected component is transferred to a new host that meets the criteria of block 210. The host may be at a secured location or may be permitted access at the given security level. The path returns to block 206.

When no more combinations are present in block 208, a sensitivity measure is assigned to the job plan in block 214. The sensitivity measure may be based upon the highest sensitivity level or based upon other criteria. In block 216, the assigned sensitivity of the job plan is displayed to the job owner in block 216. In block 218, the job owner decides whether the job plan is satisfactory. If the plan is satisfactory, the job is submitted in block 222, otherwise the selection criteria is changed in block 220 and the program returns to block 204.

Another application of the present principles includes preventing sensitive streams from leaving a secure host. To protect sensitive data from leaving a secure host in a distributed job, a method for identifying sensitive data streams, classifying their sensitivity level, and subsequently determining which host has the appropriate security constraints to safely handle and analyze the data is provided. If the identified host does not already have the required analytics for securely handling the data, the appropriate analytics are dynamically transferred to the host. This technique is particularly relevant when a customer's sensitive, proprietary data is located on a host within their scope of control, and the analytics are supplied by the service provider.

To achieve these features, data within a stream is analyzed by an analytic on a secure infrastructure to discover patterns of data that are likely to be deemed sensitive in nature before sending the stream to a separate service provider. These identified patterns are annotated as sensitive and all analytics which subsequently analyze the sensitive stream are dynamically transferred to a secure system, such as a local host or another host which has a high level of security constraints. This transfer occurs either pre-processing or during the execution itself.

Patterns can be detected via data format (e.g. Social security numbers) or via administrator-configured regular expressions and patterns. There exist techniques which are able to detect patterns, which may be employed.

The methods described herein can be implemented either before or during execution. In the case of pre-execution, before processing a job plan, the job planner determines the likelihood of each PE in the plan needing to be securely hosted. This is based on the previously determined sensitivity level of the data coming from a particular data source in the stream, based on observed characteristics of past executions of that stream.

If a particular data source is deemed likely to produce sensitive data (based on previous analysis of this source), the PEs in the job plan that will process data from that data source are moved to a processing engine that is securely hosted.

In the case where sensitive streams are dynamically determined during execution of the job, the data streams are analyzed to determine their sensitive measures based on pattern matching as described above. If a data stream is deemed sensitive, and the PEs to analyze that data were not transferred to a secure host during pre-execution, the stream processing of that stream is paused while the appropriate PEs are dynamically transferred to a secure host and the job plan is updated to reflect the newly transferred PEs. At this point, the stream processing resumes, with the sensitive data stream being routed to the securely hosted PEs.

Another application in accordance with the present principles includes protecting sensitive data in inquiries. It is often desired to cache common or processing intensive inquiry/result sets so that they can subsequently be reused without additional execution. Similar to query caching in SQL implementations, this saves time and processing power. However, there are cases where an inquiry is sensitive and should not be shared with other job owners as it may reveal sensitive information about the purpose of another secure job.

The present principles provide a way of determining the sensitivity of an inquiry or result set, and restricting access to the said inquiry/result set based on the detected sensitivity. To do so, the system/method analyzes the results of an inquiry to determine a sensitivity measure based on keywords or presence of patterns known to be sensitive. According to the job owner's sharing criteria, which may be configured in the job's profile, the inquiry/result set will not be cached and shared if the sensitivity measure exceeds a threshold. In an alternate embodiment, the set may be shared with some job owners but restricted from other job owners, based on the configuration and the job owners' defined relationship (same company or ally companies). The sharing criteria are defined in an access control list associated with the set.

Subsequently, when a SPSE user submits an inquiry, the system analyzes all available cached inquiry/result sets. Based on the defined access control list, the system pares down the sets that are not available to be shared with the owner of the new inquiry. From the remaining subset, only those inquiry/result pairs that are not likely to have changed since last execution are used, with the result being returned immediately in lieu of actual execution of the inquiry.

Some inquiries themselves may be sensitive in nature. In an environment with multiple PE providers, if the processing of such inquiries takes place on processing elements of a single service provider, the nature of the query could be inferred by the owner of the processing elements based on the processing usage. Therefore, it is desirable to identify how sensitive inquiries should be broken up and distributed into smaller jobs across multiple providers' PEs, such that no single provider can determine the full inquiry's intent based on its usage patterns. (See block 206 of FIG. 2). To properly distribute execution components of an inquiry such that the intent of the overall job cannot be deciphered by someone who observes execution patterns of one or more PEs on third party hosts, the present principles break the overall job into pieces and distribute them to separate hosts such that their intent cannot be individually inferred.

Returning to FIG. 2, in block 202, a job plan is deconstructed into smaller, distinct processing components. Each of these processing components represents the work that would be done by a single processing element to help complete the overall job. In block 204, for each combination of two or more processing components, the system/method identifies a sensitivity measure in block 206, indicating how likely it is that someone who observes the execution characteristics of those processing elements could infer sensitive information about the overall job. The sensitivity decision in block 206 may be further broken down as depicted in FIG. 3.

Figure 3:
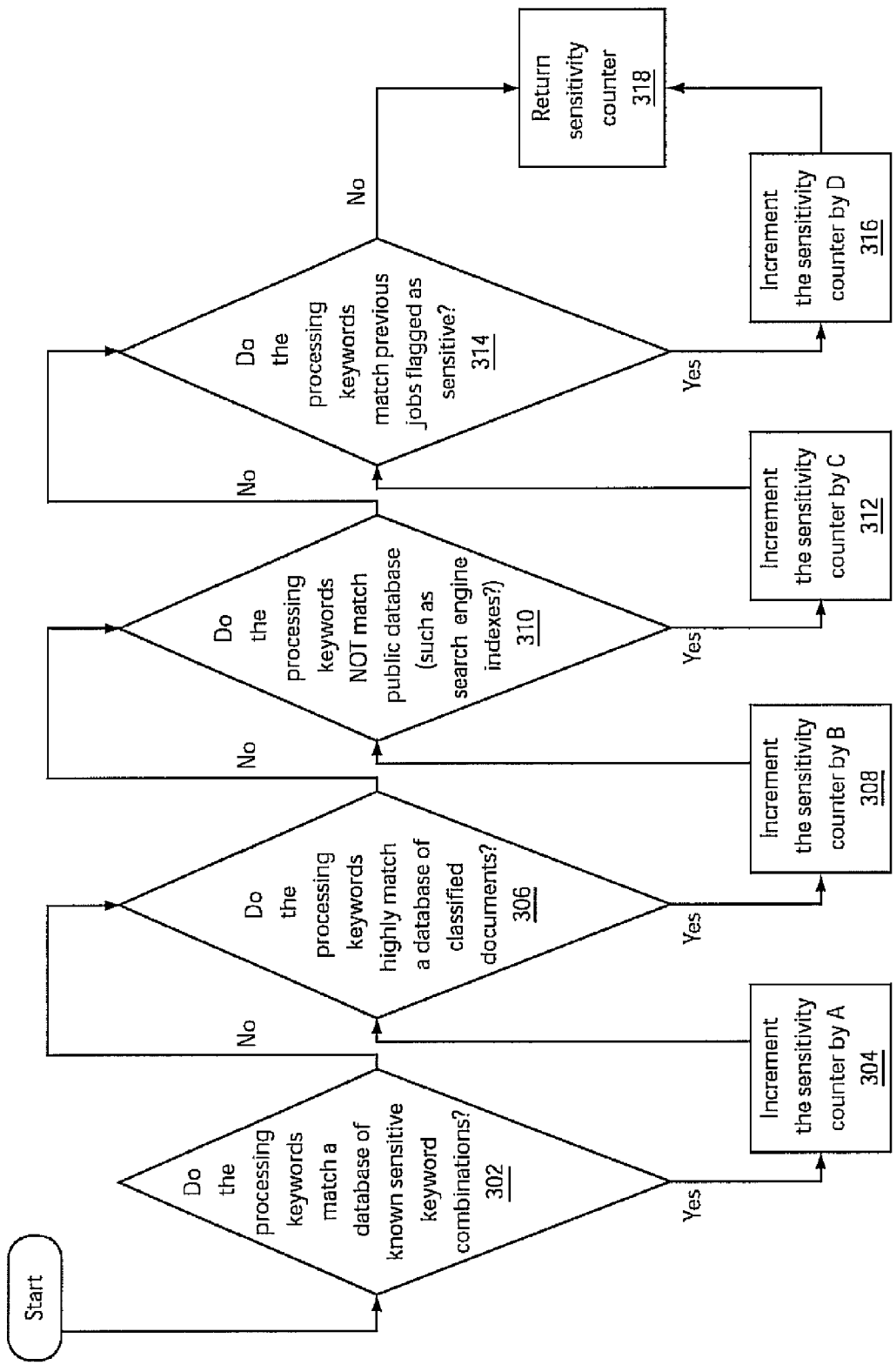
FIG. 3 is a block/flow diagram for a system/method for securely processing sensitive streams in a mixed infrastructure by determining sensitivity of job component combinations in accordance with the present principles.

Referring to FIG. 3, a system/method for distribution of inquiry processing based on sensitivity detection is illustratively depicted. In FIG. 3, block 302, the system/method analyzes the keywords within a control structure of the set of multiple processing elements. If the collection of processing keywords match known sensitive keywords combinations from a database of sensitive keywords, then the overall sensitivity counter is increased by a measure A in block 304. Measures A, B, C, etc. may be set in accordance with the particular application. A job manager or client may provide criteria which are employed to derive such measures. These measures may be based on a scoring system and the score compared to a threshold. Scoring may be cumulative or performed on a per keyword basis, among other techniques.

In block 306, if the collection of processing keywords closely matches documents from a database of classified or sensitive documents, then the sensitivity counter is increased by a measure B in block 308. In block 310, if the collection of processing keywords does NOT match common keyword combinations from public databases (such as a search engine index), then the sensitivity counter is increased by a measure C in block 312. In block 314, if the collection of processing keywords matches processing keywords from previous jobs that were marked as sensitive, then the sensitivity counter is increased by a measure D in block 316.

If the overall sensitivity counter measure exceeds a sensitivity threshold, then the set of processing components being examined are deemed sensitive when executed together (see block 206). Combinations of processing components that are deemed sensitive are then planned to be executed on separate hosts.

Each combination of processing components are subsequently analyzed in a similar manner (blocks 204 and 208) until all components have been assigned to hosts such that the cumulative sensitivity level based on processing components assigned to the same hosts has been minimized (block 220). The job plan is then presented to the job owner (block 218) who can accept the current configuration, or make changes before submitting the job (block 220).

Having described preferred embodiments of systems and methods for securely processing sensitive streams in a mixed infrastructure (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for securely processing sensitive streams in a mixed infrastructure, comprising:
   analyzing a stream, using a processor, to determine data sensitivity;
   determining a likelihood that processing elements employed to process the stream would result in a risk to sensitive information; and
   transferring at least a portion of the data stream having sensitive information to a secure processing environment to ensure security of the data stream during processing.

2. The method as recited in claim 1, wherein the method is performed during preprocessing before a job plan associated with the stream is executed.

3. The method as recited in claim 1 wherein the method is performed during execution of a job plan associated with the stream.

4. The method as recited In claim 1, wherein analyzing a stream to determine data sensitivity includes discovering patterns in the data stream to detect sensitivity.

5. The method as recited in claim 1, wherein analyzing a stream to determine data sensitivity includes:
   deconstructing a job plan into combinations of processing components; and
   determining if the combinations of processing components are deemed sensitive based on sensitivity criteria.

6. The method as recited in claim 5, wherein the criteria includes matching keywords to a known sensitive keyword combination database.

7. The method as recited in claim 5, wherein the criteria includes matching keywords with classified documents.

8. The method as recited in claim 5, wherein the criteria includes not matching keywords with a public database.

9. The method as recited in claim 5, wherein the criteria includes matching keywords with information previously determined to be sensitive.

10. The method as recited in claim 1, wherein the data stream is processed in accordance with a job plan and further comprising approving the job plan by a job owner.

11. The method as recited in claim 1, further comprising separating a computation among multiple providers to preserve security.

12. A non-transitory computer readable storage medium comprising a computer readable program for securely processing sensitive streams in a mixed infrastructure, wherein the computer readable program when executed on a computer causes the computer to perform the steps of:
   analyzing a stream to determine data sensitivity;
   determining a likelihood that processing elements employed to process the stream would result in a risk to sensitive information; and
   transferring at least a portion of the data stream having sensitive information to a secure processing environment to ensure security of the data stream during processing.

13. A method for securely processing sensitive streams in a mixed infrastructure, comprising:
   analyzing a stream, using a processor, to determine data sensitivity by discovering patterns in the data stream, computing a data sensitivity measure and comparing the data sensitivity measure to a threshold;
   for data streams having sensitive information, determining a likelihood that processing elements employed to process the stream would result in a risk to sensitive information; and
   transferring at least a portion of data streams having sensitive information to a secure processing environment to ensure security of the data stream during processing.

14. The method as recited in claim 13, wherein the method is performed during preprocessing before a job plan associated with the stream is executed.

15. The method as recited in claim 13, wherein the method is performed during execution of a job plan associated with the stream.

16. The method as recited in claim 13, wherein analyzing a stream to determine data sensitivity includes:
   deconstructing a job plan into combinations of processing components; and
   determining if the combinations processing components are deemed sensitive based on sensitivity criteria.

17. The method as recited in claim 16, wherein the criteria includes at least one of matching keywords to a known sensitive keyword combination database; matching keywords whim classified documents; not matching keywords with is public database and matching keywords with information previously determined to be sensitive.

18. The method as recited in claim 13, wherein the sensitivity criteria is employed to modify the data sensitivity measure.

19. The method as recited in claim 13, wherein the data stream is processed in accordance with a job plan and further comprising approving the job plan by a job owner.

20. A non-transitory computer readable storage medium comprising a computer readable program to securely processing sensitive streams in a mixed infrastructure, wherein the computer readable program when executed on a computer causes the computer to perform the steps of:
   analyzing, a stream to determine data sensitivity by discovering patterns in the data stream, computing a data sensitivity measure and comparing the data sensitivity measure to a threshold;
   for data streams having sensitive information, determining a likelihood that processing elements employed to process the stream would result in a risk to sensitive information; and
   transferring at least a portion of data streams having sensitive information to a secure processing environment to ensure security of the data stream during processing.

* * * * *